T. W. FOOTE.
APPARATUS FOR RECOVERING SHELLAC AND THE LIKE.
APPLICATION FILED JUNE 2, 1917.
1,368,426.
Patented Feb. 15, 1921.
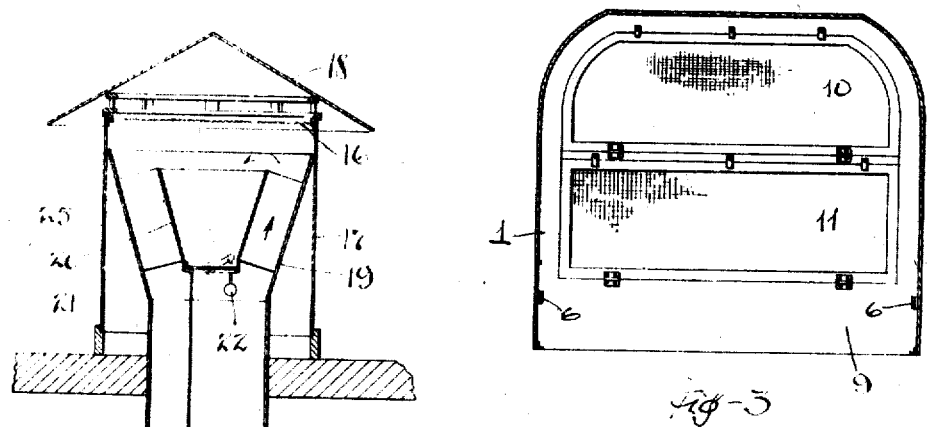
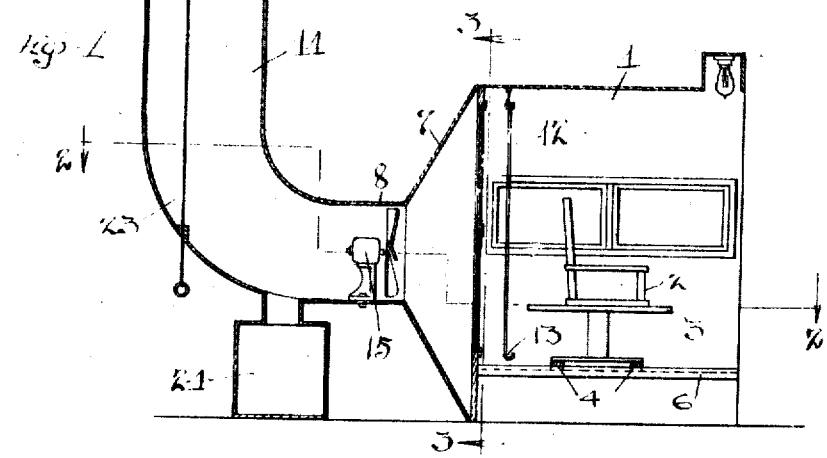
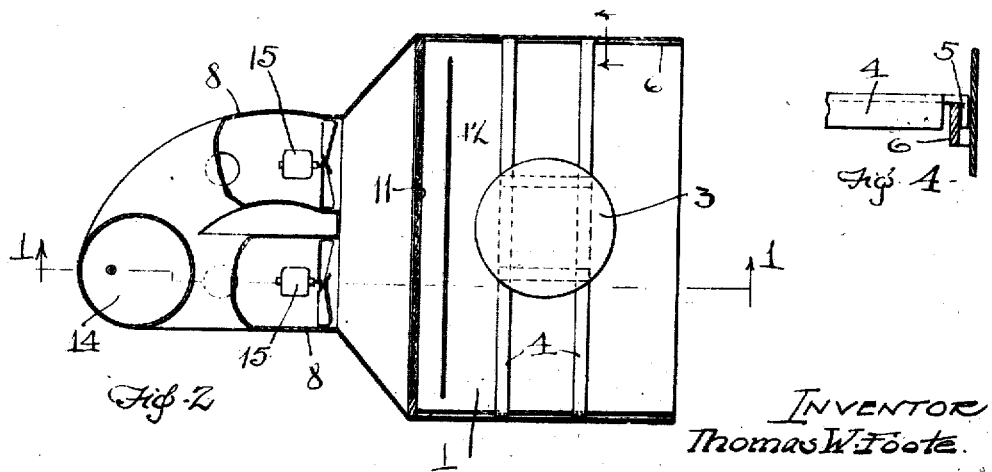
INVENTOR
Thomas W. Foote.
By Fay, Oberlin & Fay
ATTORNEYS.

UNITED STATES PATENT OFFICE.

THOMAS W. FOOTE, OF CLEVELAND, OHIO, ASSIGNOR TO THE MARBLE & SHATTUCK CHAIR COMPANY, OF BRATENAHL, OHIO, A CORPORATION OF OHIO.

APPARATUS FOR RECOVERING SHELLAC AND THE LIKE.

1,368,426.   Specification of Letters Patent.   Patented Feb. 15, 1921.

Application filed June 2, 1917. Serial No. 172,487.

*To all whom it may concern:*

Be it known that I, THOMAS W. FOOTE, a citizen of the United States, and a resident of Cleveland, county of Cuyahoga, and State of Ohio, have invented a new and useful Improvement in Apparatus for Recovering Shellac and the like, of which the following is a specification, the principle of the invention being herein explained and the best mode in which I have contemplated applying that principle, so as to distinguish it from other inventions.

The subject of the present invention is an apparatus for recovering solid matter, such as shellac or the like, from a volatile liquid, such as alcohol, which is the usual solvent of shellac. Means are provided for carrying the vapor toward a filter or screen which will cause the volatile constituents to evaporate, leaving the shellac or other substance behind, so that it can be recovered and used over again after being re-dissolved in a proper solvent. To the accomplishment of the foregoing and related ends, said invention, then, consists of the means hereinafter described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawings:—

Figure 1 is a vertical longitudinal section through my improved apparatus taken on a line 1—1, Fig. 2; Fig. 2 is a horizontal section taken on the line 2—2, Fig. 1; Fig. 3 is a vertical section taken on the line 3—3, Fig. 1; and Fig. 4 is a view of a detail of construction.

The present method of recovering solid matter, such as shellac, from a volatile liquid such as alcohol, which is the usual solvent employed, consists essentially of having suction means for drawing the vapor or shellac spray against a baffle plate so as to break it up as much as possible and then to draw it through a screen, which helps to evaporate the volatile constituent and to retain the shellac or solid matter thereon. Further means have been provided for furnishing a second screen to collect the particles which pass through the first screen before exhausting the vapor into the atmosphere.

In the drawing is shown one improved form of apparatus for carrying out this method of recovering shellac or the like. In Fig. 1 is shown the usual room 1, in which a chair 2 or other article to be coated is sprayed with shellac. This room, as illustrated, has a slidable, rotatable table 3, which is mounted on cross members 4 having hooks 5 formed on their ends, which engage over strips 6 mounted along the sides of the room. The seat or back of the chair, as shown, is mounted on this rotatable table top. The room is provided at its rear with a funnel-shaped portion 7 terminating in two exhaust conduits or pipes 8.

At the back of the room is mounted a screen or filter 9 composed of a wall having two screens 10 and 11 hinged therein and in front of these screens is hung a metal baffle plate 12 which is provided with a trough 13 at the bottom whereby the liquid caught on the plate can be conveyed to any convenient receptacle.

In the present device there is shown the funnel shaped rear of the room, which leads to the two conduits or pipes 8 which are connected to a single upwardly extending pipe 14 leading to the roof or other place where the vapor is to be exhausted. In these two conduits, fans 15 are mounted for causing the suction through the screen and these fans will be of sufficient size to cause the vapor and shellac spray together with the air in the room to be constantly exhausted toward the back of the room in order to keep the fumes away from the operator, as well as to carry the shellac against the plate and through the screens.

At the top of the building or wherever the pipe 14 exhausts, a collecting chamber has been provided which consists of a casing 17 having the usual ventilator top 18. Just below the top is mounted a second screen 16. Within the casing is the pipe 14 having a flared end 19 which extends and meets the casing near the top. Within this flared portion 19 is mounted a hollow conical pipe 20 which is seated in the part 19 by means of wings 25 which rest thereon. This conical pipe has a pivotally mounted bottom 21 which is held in its normal closed position by a weight 22. A rod or wire 23 is fastened to the rear of the pivotal point and extends downwardly through the pipe so that the door may be opened by the operator in order to allow the shellac which has collected to drop down the pipe, where it will fall into two receptacles 24 which are mounted in the two conduits leading from the fans. This collecting chamber breaks up the current of air and shellac spray and causes the spray and air to eddy around just below the screen giving time for the alcohol or other volatile liquid to evaporate and let some of the solid matter fall into the hollow pipe 20 before it goes out through the screen 16 where more is collected.

The operation of the apparatus is simple and it will of course be understood that the operator uses a brush or a spray in order to cover the furniture with the dissolved shellac, and it is the vapor and the shellac spray which does not adhere to the article being covered which is drawn against the baffle plate and through the screen by means of the fans mounted in the ducts. When the spray hits the baffle plate it breaks it up and allows the alcohol to evaporate faster so that when the small particles reach the screen the alcohol will evaporate readily, allowing the shellac to be caught and retained by the screen. When the screens are full of the solid material they may be opened and shaken or scraped in order to allow the shellac which has adhered to them to fall to the floor or into a receptacle, which can conveniently be placed below them. A certain amount of vapor and spray containing shellac will pass through the screens and will be forced up the pipe until it reaches the collecting chamber with the flaring tube 19 with the conical pipe 20 mounted therein.

When the upper screen has become clogged with shellac dust it will be shaken and then the pivoted cover for the truncated pipe will be opened and jarred by means of the cord or wire so that all of the shellac collected will be dropped through the pipe and will slide down into the receptacles stationed below the two ducts.

It will be seen that the present method and apparatus for recovering the solid matter, such as shellac and the like is very simple and yet recovers a very substantial amount of the shellac dust which is used so that the same may be re-dissolved in alcohol or other suitable volatile solvent and used over again, thus saving a large part of the expense for the shellac. The greater part of the shellac is recovered before the mixed air and spray reaches the fans, which keeps them from becoming clogged and this is an important feature of the device.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. In apparatus for recovering shellac and the like, the combination with a room in which the shellac is being used, of an exhaust conduit leading from said room, suction means mounted in said conduit for drawing the shellac-laden air and shellac spray from said room, a screen mounted in said conduit in front of said suction means and fitted in an opening in said room, a baffle plate located in said room in front of said screen adapted to break up and partially separate the shellac-laden liquid before passing to said screen, an enlarged collecting chamber in said conduit beyond the suction means, and a second screen at the exhaust outlet of said collecting chamber to effect a final breaking up and separation of the remaining shellac-laden liquid before exhausting from said conduit, and means in said collecting chamber to break up the current of air and shellac spray and cause the same to eddy before exhausting through said second screen.

2. In apparatus for recovering shellac and the like, the combination with a room in which the shellac is being used, of an exhaust conduit leading from said room, suction means mounted in said conduit for drawing the shellac-laden air and shellac spray from said room, a screen mounted in said conduit in front of said suction means, and fitted in an opening in said room, a baffle plate located in said room in front of said screen adapted to break up and partially separate the shellac-laden liquid before passing to said screen, an enlarged collecting chamber in said conduit beyond the suction means, a second cloth screen at the outlet of said collecting chamber to effect a final breaking up and separation of the remaining shellac-laden liquid before exhausting from said conduit, a conical pipe mounted in a collecting chamber and adapted to break up the current of air and shellac spray and cause the same to eddy below and before passing through said second screen, and means for removing the collected shellac dust from said chamber.

Signed by me, this 24 day of May, 1917.

THOMAS W. FOOTE.